April 3, 1951     M. N. THOMASON     2,547,673
TICKET HOLDER
Filed Oct. 26, 1948
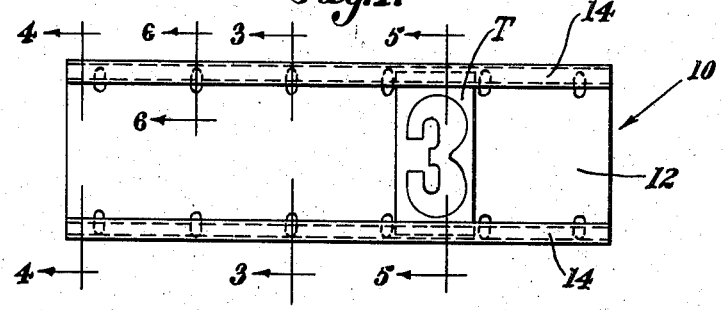
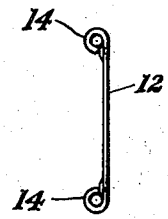
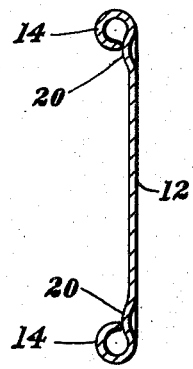
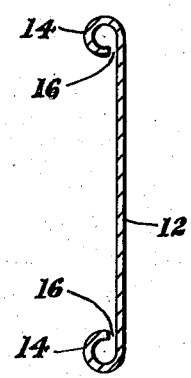
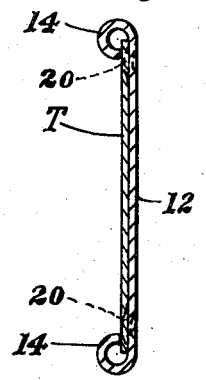
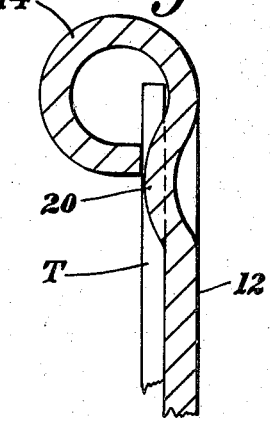
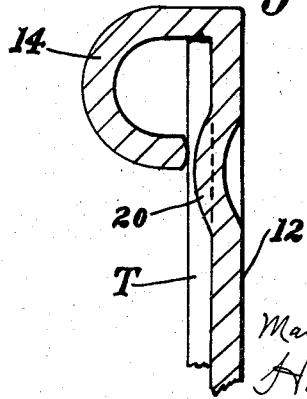
INVENTOR.
Massis N. Thomason
BY Harold E. Cole
ATTORNEY

Patented Apr. 3, 1951

2,547,673

UNITED STATES PATENT OFFICE

2,547,673

TICKET HOLDER

Massis N. Thomason, Belmont, Mass., assignor to Russell E. Maintain, Boston, Mass.

Application October 26, 1948, Serial No. 56,480

2 Claims. (Cl. 40—10)

This invention relates to a holding device for tickets such as price tickets.

The principal object of my invention is to provide a holding device for price tickets or the like that will firmly retain the tickets in predetermined positions so they cannot be slid out of place or easily removed by children or mischievous persons.

In retail stores price tickets at the front edges of shelves are often slid along the holding strip out of their intended place either accidentally or by children. Also they are often taken away by mischievous persons because they may be so quickly and easily removed. Therefore, it is my object to provide a holding device that will hold the price tickets so securely that they cannot be slid out of place or mischievously removed as aforesaid, but can be inserted in place or removed as desired by persons who are authorized to do so and hence have ample time for the task. They may even use an instrument to remove them.

The foregoing and other objects which will appear as the nature of the invention is better understood, may be accomplished by a construction, combination and arrangement of parts such as is disclosed by the drawings and specification. The nature of the invention is such as to render it susceptible to various changes and modifications, and, therefore, I am not to be limited to said disclosure; but am entitled to all such changes therefrom as fall within the scope of my claims.

Figure 1 is a front elevational view of my holding device showing a price ticket held thereby.

Figure 2 is a side elevational view of my device.

Figures 3, 4, and 5 are enlarged sectional views taken on the lines 3—3, 4—4 and 5—5 respectively of Figure 1.

Figure 6 is a greatly enlarged sectional view taken on the line 6—6 of Figure 1.

Figure 7 is a view similar to Figure 6 showing a modified form of my invention.

As illustrated, my holding device 10, usually in the form of a narrow strip of metal, is adapted to be attached to a shelf at the front edge. This strip of sheet metal, or other suitable material, has a back portion 12 and is beaded or looped over as at 14, at the top and bottom edges. Said beaded portions 14 extend forwardly of said back portion 12 and then reverse themselves and extend rearwardly to a point spaced, as at 16, slightly from said back portion 12, sufficient of said space 16 being provided to receive the top and bottom portions of a price ticket or tag T. The latter may be made of Celluloid, fiber, cardboard or any suitable thin sheet material.

Said back portion 12 is provided with projecting portions 20 which project forwardly from the front surface of said back portion at a point directly rearward of a portion of said beads 14. Part of said projecting portions 20 may extend slightly beyond, that is, below and above said upper or lower beads respectively as shown in Figures 1 and 6 of the drawings. Thus they will be visible since they are not wholly obscured by the bead.

These projecting portions 20 may be formed by striking the rear surface of said back portion 12 with a pin member or the like thus displacing, by pushing forwardly, a portion of the metal. Also they could be formed by the deposit of metal or other material on said metal strip in the positions directly under a portion of said beads 14.

The free or rearward end extremity of said bead portions 14 should either contact said projecting portions 20 or be so close to them that the space left is less than the thickness of said ticket T hence the latter cannot slide through said space but will remain in place between any two adjoining said projecting portions 20 both at the upper and lower bead portions 14.

A said ticket T is inserted in my holding device by positioning it between two laterally adjoining projections 20 and inserting an edge portion through said space 16 between the inner or rear extremity of a said bead 14 and said back portion 12 and pushing it upwardly or downwardly, as the case may be, to the positions rearwardly of said beads 14 shown in said Figures 1 and 4. Said ticket is then flexed and its opposite edge portion inserted through the opposite said space 16. Said ticket T is now firmly retained in position and cannot be slid sidewise, nor can it be removed, except by flexing said ticket and drawing opposite edge portions from their positions rearwardly of said beads through said space 16, which takes more time and strength to do than the ordinary mischievous persons will expend.

In Figure 7 of the drawings the beads are shown with the forwardly extending portions extending at a right angle to the adjoining back portion 12. This enables a price ticket T to be inserted that will take the entire space between the two said forwardly extending portions thus making it fit tightly under said beads.

What I claim is:

1. A holding device in combination with a ticket, said holding device comprising a back portion having a substantially flat face surface and beads at the top and bottom extending forwardly of said back portion and then rearwardly directly towards said back portion until the inner edge extremities thereof are adjacent to and spaced from said back portion, said spaces being sufficiently great to permit insertion of said ticket flatwise on said face surface, said back portion having projections at the top and bottom and spaced laterally apart extending forwardly to points directly opposite and closer to said edge extremities than adjoining portions of said back portion whereby said ticket cannot pass between said projections and said edge extremities flatwise, the height of said ticket not exceeding the distance between the top and bottom of said beads.

2. A holding device comprising a back portion having beads at the top and bottom extending forwardly of said back portion and then rearwardly directly towards said back portion, the inner edge extremities of said beads being adjacent to and spaced from said back portion, said back portion having projections at the top and bottom spaced laterally apart extending forwardly, the parts thereof extending farthest forwardly being opposite said inner edge extremities of said beads and being closer thereto than adjoining portions of said back portion, said projections being partly covered by said beads.

MASSIS N. THOMASON.

REFERENCES CITED

The following references are of record in the file of this patent:

UNITED STATES PATENTS

| Number | Name | Date |
| --- | --- | --- |
| 475,726 | Foote | May 24, 1892 |
| 994,734 | Fitch | June 13, 1911 |
| 2,046,121 | Hopp | June 30, 1936 |

FOREIGN PATENTS

| Number | Country | Date |
| --- | --- | --- |
| 491,649 | Great Britain | Sept. 6, 1938 |